United States Patent [19]

O'Connor

[11] Patent Number: 4,737,598

[45] Date of Patent: Apr. 12, 1988

[54] SHIELDING TAPE FOR ELECTRICAL CONDUCTORS

[76] Inventor: Lawrence O'Connor, 6027 Southboine Dr., Winnipeg, Manitoba, Canada, R3R 0B5

[21] Appl. No.: 809,717

[22] Filed: Dec. 17, 1985

[30] Foreign Application Priority Data

Dec. 17, 1984 [GB] United Kingdom ................. 8431784

[51] Int. Cl.⁴ ....................... B32B 15/00; B32B 23/02; H01B 7/34
[52] U.S. Cl. ..................................... 174/36; 174/115; 428/192; 428/377; 428/379; 428/383; 428/457; 428/458; 428/461
[58] Field of Search ............... 428/375, 379, 383, 389, 428/377, 457, 458, 461, 192; 174/36, 103, 105 R, 107, 108, 115

[56] References Cited

U.S. PATENT DOCUMENTS

| 3,032,604 | 5/1962 | Timmons | 174/36 X |
| 3,624,267 | 11/1971 | Plummer | 174/36 |
| 3,794,750 | 2/1974 | Garshick | 174/36 |
| 4,268,714 | 5/1981 | Mori | 174/36 X |
| 4,323,721 | 4/1982 | Kincaid et al. | 174/36 |
| 4,327,246 | 4/1982 | Kincaid | 174/36 |

Primary Examiner—Lorraine T. Kendell
Attorney, Agent, or Firm—Adrian D. Battison

[57] ABSTRACT

A shielding tape for wrapping an electrical conductor is formed from an laminate of a conducting fold layer and an insulating dielectric layer. One longitudinal edge of the laminate is folded back with the foil layer inner most so as to define a pocket which contains a multi-strand ground wire. The shielding tape can be wrapped around the conductor or conductors longitudinally with the foil layer inner most and an opposed edge folded in the opposite direction to provide electric continuity first of all alternatively the tape can be wrapped longitudinally with the foil layer outer most.

20 Claims, 2 Drawing Sheets

SHIELDING TAPE FOR ELECTRICAL CONDUCTORS

BACKGROUND OF THE INVENTION

This invention relates to a prefolded shielding tape for shielding electrical conductors including a ground wire and to a cable when formed using such tape.

In the field of telecommunication and data transmission including multiconductor cable assemblies, particular care is required to ensure that adjacent pairs of conductors are isolated from each other and that each pair of insulated conductors is also electrically shielded from its neighbors. If this is not done interference between adjacent pairs of conductors may occur. Furthermore, the shielding of adjacent pairs, throughout the length of the cable, should be isolated so as not to allow random contact between adjacent shields which may cause signal interference. Grounding, or interconnection of shields, is required to be accomplished at designated points only, i.e. at the terminus of the cable, and may be combined with a ground wire which is generally included with each pair of shielded conductors.

Each pair of conductors is helically twisted together during cable manufacture to minimize inductance, and this operation has been combined using one of several methods to apply a shield and insulating dielectric layer usually of aluminum foil and suitable plastics film respectively.

In 1962 U.S. Pat. No. 3,032,604 assigned to Belden Corporation, and now expired, disclosed a method of shielding and isolating a single conductor or pair of conductors by applying a laminate of foil and film with one edge folded back upon itself.

Belden Corporation has promoted the use of a tape in which the opposite edge is folded back upon itself in the opposite direction so that at one edge of the tape the insulating layer is exposed and at the other edge the foil layer is exposed. Such a tape can be wrapped around the conductors and the ground wire in such a way that the foil layer provides a continuous shield and yet is completely covered by the insulating layer so that it cannot contact the shields of adjacent layers.

Such an arrangement is also shown in Canadian Pat. No. 1120562 (Sumitomo).

The manufacture of a cable of this type requires the ground wire to be applied to the twisted conductors either in the twisting process or as a separate step following which the tape is applied as a shield.

This arrangement has a number of disadvantages in that it requires the tape, ground wire and conductors to be applied separately. In addition, the contact between the ground wire and the shield is certainly not guaranteed and can be broken at various points along the length of the cable by the position of the ground wire relative to the conductors.

Canadian Pat. No. 999941 (Boston Insulated Wire and Cable) addresses this problem and provides ground wires in the form of strips embedded between a foil layer and the insulating dielectric layer. In another embodiment the strips are embedded between the foil layer and an additional strip of insulating dielectric layer on the opposite side of the foil layer from the dielectric layer. This arrangement has not achieved any commercial success and has severe disadvantages in relation to its difficulty and cost of manufacture which have probably prevented its effective competition with existing prior art products including those mentioned above.

It is one object of the present invention, therefore, to provide an improved construction of tape which can be used to manufacture a cable of this type which overcomes the above disadvantages.

SUMMARY OF THE INVENTION

According to the invention, therefore, there is provided a shielding tape for wrapping an insulated electrical conductor comprising a laminate of a conducting foil layer and an insulating dielectric layer, one longitudinal edge of the laminate being folded back so as to form a fold portion along the tape with the foil layer of the fold portion facing inwardly toward the foil layer and the insulating layer lying outwardly thereof, and a continuous conducting ground wire contained between the foil layer and the foil layer of the fold portion thus providing continuous contact between the ground wire and the foil layer.

Preferably the fold is maintained by a layer of adhesive which joins the folded edge back to the foil layer so that the wire is fully enveloped by the fold and the adhesive layer.

In addition, the preferred construction provides a tape in which the other edge is also folded back in the opposite direction so that the foil layer lies outermost.

According to a second aspect of the invention there is provided an electrical cable comprising at least one conductor having therearound an insulating layer, said conductor having wrapped therearound a shielding tape comprising a laminate of a conducting foil layer and an insulating dielectric layer, one longitudinal edge of the laminate being folded back so as to form a fold portion along the tape with the foil layer of the fold portion facing inwardly toward the foil layer and the insulating layer lying outwardly thereof, and a continuous conducting ground wire contained between the foil layer and the foil layer of the fold portion thus providing continuous contact between the ground wire and the foil layer.

The wire provides the ground wire for the cable and is permanently and effectively contained within the cable by the folded portion of the tape. The ground wire and the tape can be applied to the twisted pairs of conductors in a multiconductor cable or directly over the core in shielded cables as a single process preferably in a longitudinal direction. Thus the ground wire is continuously in contact with the foil layer throughout the length of the tape and therefore throughout the length of the cable.

The prefolded tape can be provided on a traverse wound package so that a wrapping station draws the tape from the package for direct application to the twisted conductors or cable.

The foil is preferably aluminum foil which depending upon requirements can have a thickness between 0.00025 inches and 0.002 inches. The dielectric layer is preferably of polyester film and this can have a thickness in the range 0.00025 inches to 0.002 inches. In some cases, polypropylene can be used as the dielectric layer. The foil and film are laminated into a web prior to slitting into separate tapes and folding with the lamination generally being provided at a separate process. Lamination can be carried out using any well-known technique but preferably with an adhesive thus forming a web which may be up to 72 inches wide.

From the web tapes can be slit using a conventional series of razor blades or other knife-type slitters arranged across the width to provide tapes having a width lying in the range 0.25 to 2.0 inches and typically of the order of 0.75 inches.

With the foregoing in view, and other advantages as will become apparent to those skilled in the art to which this invention relates as this specification proceeds, the invention is herein described by reference to the accompanying drawings forming a part hereof, which includes a description of the best mode known to the applicant and of the preferred typical embodiment of the principles of the present invention, in which:

DESCRIPTION OF THE DRAWINGS

In the drawings like characters of reference indicate corresponding parts in the different figures.

DETAILED DESCRIPTION

Figure 1:
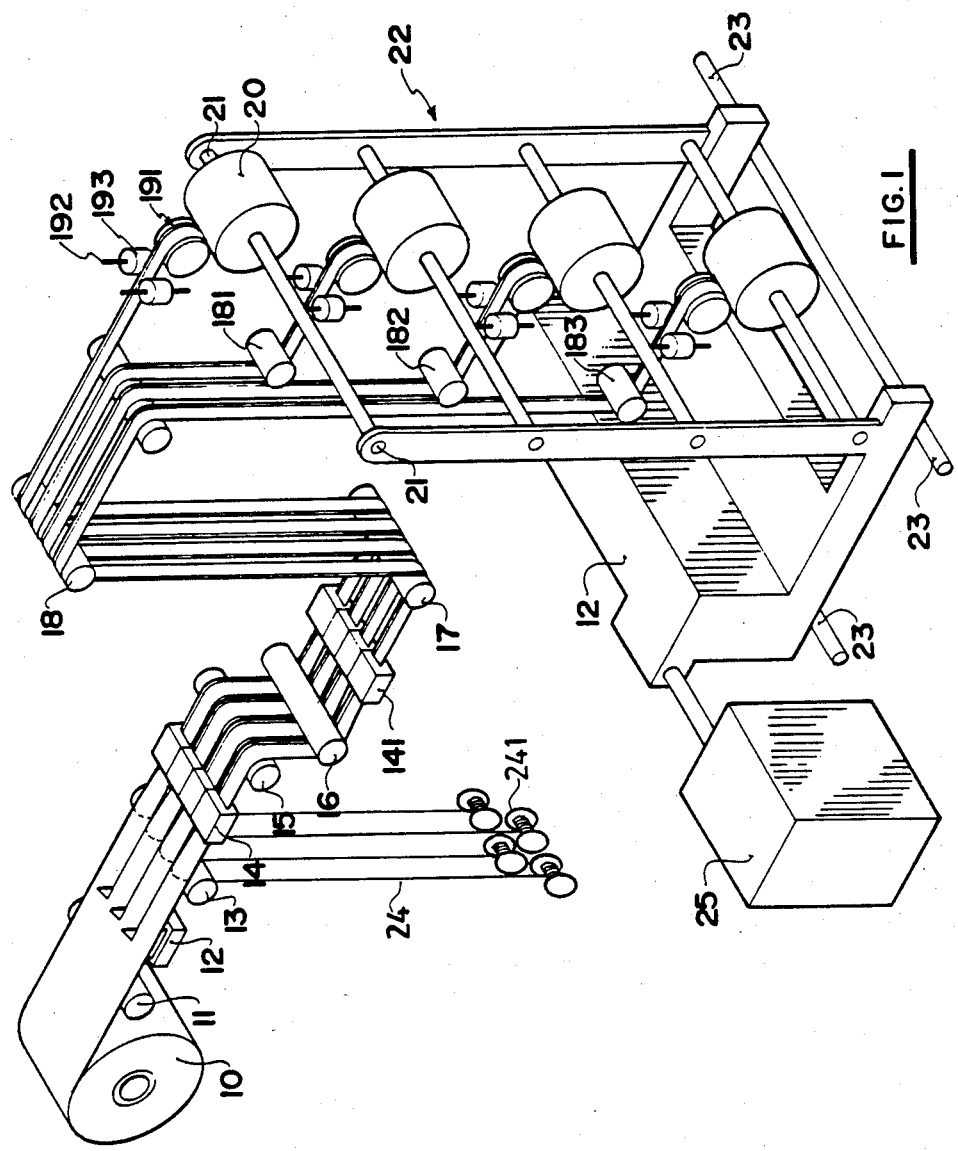
FIG. 1 is a schematic isometric view of apparatus and method of forming and packaging a tape according to the invention.

Turning firstly to FIG. 1 there is shown a supply roll 10 of a laminated web having a layer of aluminum foil and a layer of a dielectric material.

The web may be up to 72 inches wide. The web passes over an idler roller 11 to a slitting station 12, including a plurality of slitting knives of conventional form where the web is slit into a number of separate tapes each of accurately controlled width. The separate tapes then pass to a second idler roller 13 so the tension and direction is accurately controlled through the slitting zone.

At the idler roller, each tape is joined with a respective one of a plurality of wires 24 each supplied from a spool 241 so that the wire runs along with the tape and lies longitudinally of the tape at a position spaced from the outer edge.

Figure 3:
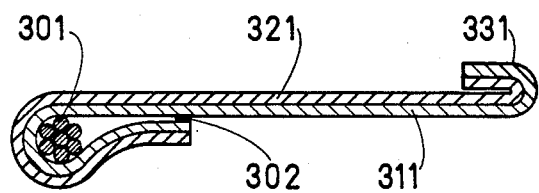
FIG. 3 is a schematic sectional view of a shielding tape according to the invention.

The slit tapes and wire then pass directly to a plurality of folding shoes or forming rollers 14 where each tape is folded so that one longitudinal edge is rolled back on itself to form a fold at the edge. The fold is arranged to be substantially at the wire so that the tape wraps around the wire as shown in FIG. 3. A strip of adhesive is also applied to the edge of the tape at the folding head, or alternatively prior to the folding head. The fold may optionally be further creased into position by rolling around the outside of an idler roller 15 to assist in permanently forming the fold into position.

The tape then passes around further idler rollers 16, 17, 18 to return to the original direction.

A second set of folding shoes 141 can be included downstream of the first after the roller 16 and before the roller 17 in order to fold the opposite edge of the tape in the opposite direction, the direction of the roller 17 being such that the newly folded portion lies preferably outermost.

Downstream of the roller 15 is positioned a number of winding stations. Each winding station comprises a lay-on roller 191 and a guide shaft 192 mounting guide rollers 193 to control the direction and movement of the tape. The shaft 192 and the roller 191 are mounted on a main frame of the apparatus which is omitted from the illustration for reasons of simplicity. Thus the tapes are separated at a roller 180 and at further redirecting rollers 181, 182, 183 to lead to the separate winding stations for separate winding on packages 20.

The packages 20 are separately mounted on shafts 21 mounted on a carriage generally indicated at 22. The carriage 22 is mounted on slide guides 23 for reciprocating movement in a tape traversing direction so the package is traversed relative to a winding position of the tape defined by the lay-on roller 191 and the guide 192. The device for traversing the package carriage 22 is indicated schematically at 25. Details of this device are described in Canadian Pat. No. 1,173,813 issued on Sept. 4, 1984 (U.S. Pat. No. 4,477,035). The device 25 therefore acts to traverse the carriage to produce a traverse package in which the movement of the carriage is substantially reciprocating.

Figure 2:
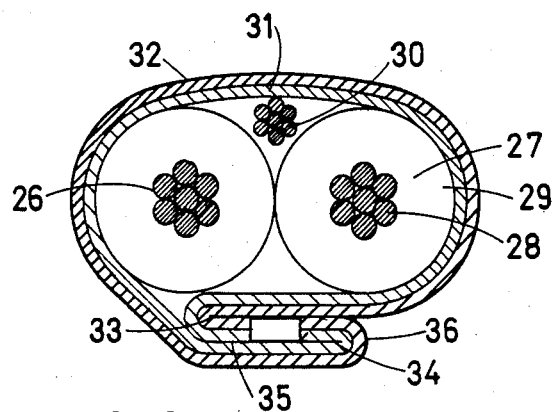
FIG. 2 is a schematic cross sectional view of a conventional or prior art cable incorporating a shielding tape.

Turning now to FIG. 2 there is shown a conventional cable construction including a pair of conductors 26 and 27 each of which is formed by a multistrand conductive wire 28 and an outer insulating layer 29. The conductors 26 and 27 are twisted around one another as previously described in a conventional cabling process. In addition, a multistrand ground wire is added to the conductor pair and indicated at 30. The cable comprising the conductors 26, 27 and the wire 30 is wrapped by a tape formed from a laminate of a foil layer 31 and an insulating dielectric layer 32.

It will be noted that one edge indicated at 33 of the tape is folded back so that the foil layer lies outermost and the other edge indicated at 34 is folded back so that the dielectric layer is outermost. With the tape arranged longitudinally or helically of the conductor pair, the fold of foil contacts the inner surface of the foil at the point indicated at 35 so as to ensure continuity of the foil screen completely around the conductors and drain wire. At the same time, the edge indicated at 36 of the outer dielectric layer ensures that no edge of the foil is exposed at any point for in any way contacting the foil layer of an adjacent cable.

Turning now to FIG. 3 which shows the tape of the present invention, the tape is formed of an insulating dielectric layer indicated at 321 and a conducting foil layer indicated at 311. One edge of the tape is folded back as previously described in the method illustrated in FIG. 1 so as to envelope and enclose the ground wire indicated at 301. The adhesive strip is indicated at 302 and ensures that the edge of the tape is secured to the foil surface to maintain the ground wire enclosed and properly in position within the loop or fold defined by the folded edge. The opposite edge of the tape is folded back at 331 so that the foil layer 311 is outermost.

Figure 4:
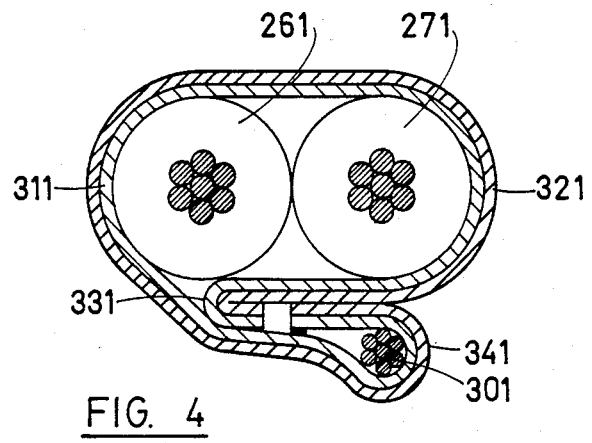
FIG. 4 is a schematic cross sectional view of a pair of conductors wrapped by the shielding tape of FIG. 3.

Turning now to FIG. 4 there is shown a cross section of cable manufactured using the tape of FIG. 3. In this cable a pair of conductors 261 and 271 is twisted in conventional manner and is of the same construction as the conductors of FIG. 2.

The tape is then wrapped around the twisted conductor pair in a longitudinal wrapping process so that the fold 331 is tucked inwardly of the fold 341 which includes the ground wire 301. In this way, the continuity of the foil layer 311 is maintained as previously described while the ground wire 301 is permanently attached to the cable in a single process and maintained in permanent continuous contact with the foil layer by the fold 341. The conventional PVC jacket is indicated at 40.

The construction of conductors shown is only exemplary and it will be appreciated that other types of conventional conductors can be used. In addition, the ground wire 301 is shown as a multistrand wire whereas this can, in other cases, comprise a single strand of suitable gauge. One example of gauge which can be used is 24 gauge wire since this has suitable dimensions to be wrapped by the fold 341 and yet provide the necessary electrical properties.

In an alternative structure (not shown), the tape of FIG. 3 can be used externally of for example three pairs of conductors to wrap the cable immediately inside the conventional PVC jacket. Thus the tape is applied at the jacket extruder so that the tape and enclosed ground wire are wrapped longitudinally of the twisted conductor pairs and immediately covered by the extruded PVC jacket. In this case, the foil layer is arranged outermost so that the dielectric (preferably polyester) layer lies in contact with the shielded conductor pairs and the foil layer contacts the inner surface of the jacket.

This arrangement has the additional advantage relative to the conventional cable structure that the ground wire is enclosed within the tape and hence is separated from the PVC jacket. In one conventional cable structure, the ground wire lies outside the foil layer so as to lie in contact therewith and tends to cut the PVC jacket.

Since various modifications can be made in my invention as hereinabove described, and many apparently widely different embodiments of same made within the spirit and scope of the claims without departing from such spirit and scope, it is intended that all matter contained in the accompanying specification shall be interpreted as illustrative only and not in a limiting sense.

I claim:

1. A shielding tape for wrapping an insulated electrical conductor comprising a laminate of a conducting foil layer and an insulating dielectric layer, one longitudinal edge of the laminate being folded back so as to form a fold portion along the tape with the foil layer of the fold portion facing inwardly toward the foil layer and the insulating layer lying outwardly thereof, and a continuous conducting ground wire contained between the foil layer and the foil layer of the fold portion thus providing continuous contact between the ground wire and the foil layer.

2. The shielding tape according to claim 1 further comprising a strip of adhesive between the foil layer of the fold portion at the outer most edge thereof and the foil layer so that the ground wire is fully enveloped by the foil layer.

3. The shielding tape according to claim 2 wherein the ground wire is contacted solely by said foil layer and is free from embedding material.

4. The shielding tape according to claim 1 wherein said ground wire between said foil layer and the foil layer of the fold portion comprises the sole ground wire of said shielding tape.

5. The shielding tape according to claim 1 wherein an opposed edge of said laminate is folded back so as to form a fold portion along said opposed edge of the tape with insulated dielectric layer of the fold portion facing inwardly toward the insulating dielectric layer and the foil layer lying outwardly thereof.

6. The shielding tape according to claim 1 wherein the ground wire comprises a multi-strand wire.

7. The shielding tape according to claim 1 wherein the laminate is formed by slitting from a master laminate web whereby edges of the foil and insulating dielectric layers are coterminous.

8. The shielding tape according to claim 1 wherein the foil and insulating dielectric layers have a thickness in the range 0.00025 inches and 0.0002 inches.

9. An electrical cable comprising at least one conductor having therearound an insulating layer, said conductor having wrapped therearound a shielding tape comprising a laminate of a conducting foil layer and an insulating dielectric layer, one longitudinal edge of the laminate being folded back so as to form a fold portion along the tape with the foil layer of the fold portion facing inwardly toward the foil layer and the insulating layer lying outwardly thereof, a continuous conducting ground wire contained between the foil layer and the foil layer of the fold portion thus providing continuous contact between the ground wire and the foil layer and an insulating jacket applied around the shielding tape.

10. The electric cable according to claim 9 further comprising a strip of adhesive between the foil layer of the fold portion at the outer most edge thereof and the foil layer so that the ground wire is fully enveloped by the foil layer.

11. The electric cable according to claim 10 wherein the ground wire is contacted solely by said foil layer and is free from embedding material.

12. The electric cable according to claim 9 wherein said ground wire between said foil layer and the foil layer of the fold portion comprises the sole ground wire of said shielding tape.

13. The electric cable according to claim 9 wherein an opposed edge of said laminate is folded back so as to form a fold portion along said opposed edge of the tape with insulated dielectric layer of the fold portion facing inwardly toward the insulating dielectric layer and the foil layer lying outwardly thereof.

14. The electric cable according to claim 9 wherein the ground wire comprises a multi-strand wire.

15. The electric cable according to claim 9 wherein the laminate is formed by slitting from a master laminate web whereby edges of the foil and insulating dielectric layers are coterminous.

16. The electric cable according to claim 9 wherein the foil and insulating dielectric layers have a thickness in the range 0.00025 inches and 0.0002 inches.

17. The electric cable according to claim 9 wherein the shielding tape is wrapped longitudinally of said conductor.

18. A shielding tape for wrapping an insulated electrical conductor comprising a laminate of a conducting foil layer and an insulating dielectric layer, one longitudinal edge of the laminate being folded back so as to form a fold portion along the tape with the foil layer of the fold portion facing inwardly toward the foil layer and the insulating layer lying outwardly thereof, and a continuous conducting ground wire contained between the foil layer and the foil layer of the fold portion thus providing continuous contact between the ground wire and the foil layer, said ground wire being maintained in position therebetween solely by contact of said ground wire with the foil layer and the foil layer of the fold portion.

19. The shielding tape according to claim 18 further comprising a strip of adhesive between the foil layer of the fold portion at the outer most edge thereof and the foil layer so that the ground wire is fully enveloped by the foil layer.

20. A package of shielding tape for wrapping an insulated electrical conductor comprising a traverse wound cylindrical package of tape having a length greater than the width of the tape, said tape comprising a laminate of a conducting foil layer and an insulating dielectric layer, one longitudinal edge of the laminate being folded back so as to form a fold portion along the tape with the foil layer of the fold portion facing inwardly toward the foil layer and the insulating layer lying outwardly thereof, and a continuous conducting ground wire contained between the foil layer and the foil layer of the fold portion thus providing continuous contact between the ground wire and the foil layer.

* * * * *